Patented May 13, 1930

1,758,151

UNITED STATES PATENT OFFICE

NORRIS GOODWIN, OF LOS ANGELES, CALIFORNIA, ASSIGNOR, BY MESNE ASSIGNMENTS, TO DELANO LAND COMPANY, A CORPORATION OF CALIFORNIA

VULCANIZABLE PLASTIC COMPOSITION

No Drawing. Application filed March 10, 1924, Serial No. 698,290. Renewed November 7, 1928.

My present invention relates especially to vulcanizable plastic compositions containing carbon in addition to rubber and sulphur, with which other customary or preferred ingredients may be associated; and to methods of preparing such vulcanizable compositions.

The carbon which I employ in my present invention and the method of making the same is described and claimed in my co-pending application, Serial No. 698,291, filed March 10, 1924.

It is an object of this invention to utilize, in compositions and processes of the character referred to, a carbon which is very finely subdivided and whose particles appear to be, as a result of an advantageous mode of production, outlined, but not claimed, herein, separately provided with coating films of a character which renders them (1) non-hygroscopic and non-miscible with water, (2) capable of ready and permanent cohesive union with rubber and sulphur, (3) comparatively non-activatable, being non-absorptive not only of gases and of ordinary organic coloring matters, but of substances commonly used to accelerate the curing of vulcanizable compositions,—such carbon, referred to as "Goodwin carbon" being further distinguished by (4) unusual keeping qualities and by (5) an "oil-absorption" advantageously low, as implying no impairment of the tackiness of a rubber composition containing the same, and by (6) an unusual toughness in the vulcanized products containing a given weight of the same.

To illustrate the practice of my present invention, utilizing the mentioned Goodwin carbon in the economical production of a vulcanizable compostion suitable for use in the manufacture of tires, I may mix together suitable ingredients in proportion substantially as follows:

| | |
|---|---|
| Sulphur | 0.50 lb. |
| Zinc white | 4.25 lbs. |
| Lime (oxid) | 1.00 oz. |
| Diphenylguanidine | 1.50 oz. |
| Mineral rubber | 1.75 lbs. |
| Cotton seed oil | 6.00 oz. |
| Magnesia | 1.00 lb. |
| Smoked sheet rubber | 13.00 lbs. |
| Goodwin carbon | 2.00 lbs. |

So far as my present invention is concerned, the rubber, sulphur and Goodwin carbon may be regarded as the indispensable ingredients; and proportions may, of course, be varied within wide limits, according to the intended use of the product.

The above-mentioned Goodwin carbon is an impalpable black powder of a very low apparent density. Analysis has shown it to contain from 0.25 to 0.5% of material extractable in acetone. This acetone-extractable material is insoluble in water; and it is believed to be present as an exceedingly thin film surrounding and protecting the individual carbon particles, and tending to render the same non-hygroscopic.

Carbon black, as heretofore used in vulcanizable compositions, this being a material from which Goodwin carbon must be carefully distinguished, is known to have been produced by the collecting of carbon on comparatively cool metallic surfaces moving relatively to a flame or flames of a hydrocarbon such as natural gas, a reduction of temperature by contact with the metallic surface being effective in preventing a complete combination of such oxygen as may have been admitted, and this process being such that the temperature of the deposited carbon can scarcely have reached 1000° F.

Although Goodwin carbon, as required in my novel compositions, is now an article of commerce, I desire to emphasize for the sake of completeness, the unique properties which especially qualify this preferred carbon for the use referred to, said properties apparently resulting from a mode of production in which a restricted supply of oxygen and a comparatively high temperature, produced by an extraneous source of heat, are concurrently employed,—with the result that practically all of the oxygen of the introduced air is consumed, and the deposited carbon particles appear to be coated in a manner especially advantageous to the uses referred to.

Goodwin carbon is best produced at temperatures in excess of 1250° F., this being, as indicated, probably several hundred degrees above the temperature to which particles of carbon black are subjected. When Goodwin carbon is produced from a mixture of air and hydrocarbon gas or vapor, containing insufficient oxygen completely to oxidize the hydrogen and carbon present, no effort is made to chill the products of the reaction, which preferably takes place in a chamber heated to a temperature higher than that normally produced by the oxidation process. In fact, every condition is favorable to a completion of a reaction and to the attainment of an equilibrium controlled entirely by the limited supply of oxygen.

It will be appreciated that the foregoing conditions are in direct contrast with the conditions prevailing in the manufacture of carbon black by the channel, disk, or plate processes, wherein the oxidation process is as mentioned, purposely checked by the employment of relatively cool metallic surfaces. The fundamental differences in manufacturing methods here referred to may be restated as follows: Goodwin carbon is produced by an incomplete oxidation and a thermal decomposition of a hydrocarbon material, with the aid of extraneous heat, the completeness of the oxidation being so limited by the amount of oxygen present that the direction of the reaction is favorably controlled, and so as to completely, or almost completely consume the available oxygen and to produce a product having the unique properties described; whereas carbon black, also produced by an incomplete oxidation of a hydrocarbon material, results from a process in which the completeness of oxidation is limited by the chilling action of a relatively cool surface contacting with the tip of a flame,—which implies not only an incomplete consumption of the oxygen present, but also a very incomplete utilization of the oxidizable material present.

The important difference and advantages of Goodwin carbon, as used in my novel vulcanizable compositions, may be further stated under separate headings, as follows:

Oil-absorption and tackiness

The "oil-absorption" of Goodwin carbon is very much less than that of carbon black. By oil absorption is meant the amount of linseed oil, or other oil of similar nature, that must be added to a given weight of finely divided carbon, in order to produce a putty-like mass of given stiffness or consistency. The ratio is about three pounds of oil to one pound of carbon in the case of a carbon black, while two pounds of oil will give the same consistency in the case of Goodwin carbon. This fact is of great importance to the rubber compounder, since rubber compounds containing carbon black have been known to possess a leathery consistency, making these compounds difficult to mold or form in subsequent operations preceding vulcanization. In the case of Goodwin carbon, large percentages may be added to the compound without injuring its soft, tacky nature or working qualities.

Keeping qualities

Goodwin carbon is not wet by water. This, as has been intimated, is probably due to the presence of a very thin film of an acetone-soluble material, insoluble in water, which seems to protect the carbon surface from contact with water. The property here referred to is of inestimable industrial importance, as rendering unnecessary the great care that has heretofore been required both in the shipping and the storing of carbon black.

Non-adsorption, economy of accelerators and short cure

So far as concerns its use in the manufacture of vulcanizable compositions, it is an advantage of Goodwin carbon that it is not adsorbent, in the sense that "gasmask" charcoal is adsorbent. The process of increasing the adsorbing qualities of a charcoal or carbon has been termed "activation" and the carbon resulting from the activation process has been termed "activated carbon". It appears to be quite a general rule that carbons released from chemical combination at temperatures in excess of 1000° F. do not respond to the activation process, but are what may be termed "non-activatable" carbons. Carbon black has heretofore been activated, and it has produced a material of comparatively high adsorbing qualities; but Goodwin carbon has thus far proven to be relatively non-adsorbent and relatively non-activatable.

The important difference here referred to might be explained by the mentioned fact that carbon black is probably released from chemical combination at a temperature below 1000° F.; whereas Goodwin carbon may advantageously be produced even at temperatures between 1500° and 3000° F. and above. Carbon black decolorizes alcoholic solutions of various dyes, to a very large degree; while Goodwin carbon produces almost no change in the colors thereof.

Connected with the foregoing, may be mentioned a property of Goodwin carbon that is very important from the standpoint of the rubber compounder. It is common knowledge that carbon black, as heretofore prepared, greatly retards the curing time of compounds containing organic accelerators. Goodwin carbon, under the same conditions, produces little or no apparent retardation of cure. For instance, in one stock of similar composition to those commonly used in automobile tire treads, the time required for curing, when carbon black was used, was 55 minutes, while, when Goodwin carbon was substituted for the carbon black, the curing time was between 40 and 45 minutes.

The mentioned retardation of curing time by carbon black is probably due to an absorption of the accelerator, from solution in the rubber compound by the carbon black, appreciable absorption apparently not taking place in the case of the Goodwin carbon. It has been found by experiment that between 30% and 40% less accelerator need be used with Goodwin carbon than with carbon black, assuming equality in the curing times of the compounds and equality in the resultant quality of product.

Flat curing curve

A characteristic of Goodwin carbon in vulcanizable rubber compounds is a very flat curing curve. That is to say, it may quickly attain its optimum curing temperature; yet a prolonging of the time of curing shows little tendency to overcure, as would be evidenced by a lowering of the tensile strength and by elongation. Carbon block, on the other hand, rises more or less slowly to an optimum, as measured by resultant tensile strength; and it more abruptly falls off on a prolonging of the heating beyond the point of optimum cure. This factor is of extreme importance, particularly in curing massive pieces, such as solid tires, etc., since a uniform cure has in the past been very difficult to attain, due to the fact that by the time the heat has penetrated to the central core of the rubber, the outer layers are apt to be overcured. Where Goodwin carbon is used, this is not true, since extending the curing time beyond the point of optimum cure does not result in a serious over-cure.

Stiffening effect

The finely divided carbon called carbon black has heretofore been added to rubber compounds, not so much for a coloring, as for a stiffening or toughening effect. Goodwin carbon is now found to give several times the stiffening effect that ordinary carbon black would give under the same conditions. The term "stiffness", as applied to rubber, may be defined as meaning that quality of the rubber or rubber compound which is commonly measured in terms of the load at a given elongation of the test piece. For instance, the above compound shows the following stress strain characteristics when compounded, (1) with ordinary carbon black and (2) with Goodwin carbon:

| (1) With Carbon black | | (2) With Goodwin carbon | |
|---|---|---|---|
| Load | Per cent elongation | Load | Per cent elongation |
| 170 | 100 | 283 | 100 |
| 400 | 200 | 745 | 200 |
| 855 | 300 | 1340 | 300 |
| 1290 | 400 | 2110 | 400 |
| 1900 | 500 | 2980 | 500 |

The load figures given above are in pounds per square inch and were made under carefully controlled conditions, the only variation being in the carbon used. The greater stiffening effect obtained in the case of Goodwin carbon is of inestimable value for tire treads, soles and heels, etc., since wearing qualities depend to a large extent upon the stiffness or toughness of the compound.

A mixture, prepared substantially as above, with or without fibrous additions, may be molded and vulcanized in a known way, except that the period of curing may, for equal effects, be abridged by twenty per cent or more.

Although I have herein described one complete embodiment of my invention, it will be obvious that various modifications might be made without departure from the spirit and scope of my invention as the same is indicated above and in the following claims.

I claim as my invention:

1. The process of producing vulcanizable rubber compounds which comprises incorporating, with other ingredients, including rubber and sulphur, a finely divided carbon having minimum oil-absorption properties and having the further characteristic of stiffening the rubber as much as a relatively equal weight of common commercial carbon black.

2. The process of producing vulcanizable rubber compounds which comprises incorporating, with other ingredients, including rubber and sulphur, a finely divided carbon having the characteristic of not being miscible with water, and containing a small percentage of material soluble in acetone but insoluble in water.

3. The process of producing vulcanizable rubber compounds which comprises incorporating, with other ingredients, including rubber and sulphur, a finely divided carbon which is relatively non-adsorbent and relatively non-activatable and which has the further characteristic of stiffening the rubber as much as a relatively equal weight of common commercial carbon black.

4. A vulcanizable mixture containing rubber, and a form of carbon having the characteristic of giving to the vulcanized mixture a tensile strength which is substantially independent of the curing time.

5. The process of producing vulcanizable rubber compounds which comprises incorporating, with other ingredients, including rubber and sulphur, a finely divided carbon having the characteristic of quickly attaining an optimum curing temperature with slight tendency to overcure from a prolonging of the time of curing.

6. A rubber composition comprising a rubber stock having incorporated therein "Goodwin" carbon.

7. A rubber composition comprising a rubber stock having incorporated therein "Goodwin" carbon and characterized by having a stiffness no less than that of a rubber composition containing the same relative amount of common commercial carbon black.

8. The process of compounding rubber comprising the step of incorporating therein a non-activatable, non-wettable finely divided carbon having the characteristic of stiffening the rubber no less than a relatively equal weight of common commercial carbon black.

9. A rubber composition comprising a rubber stock having incorporated therein a finely divided carbon having an oil absorption number less than that of common commercial carbon black, and characterized by having a stiffness no less than a rubber composition containing a relatively equal amount of common commercial carbon black.

10. A rubber composition comprising a rubber stock having incorporated therein a finely divided carbon having an oil absorption number less than 100, and characterized by having a stiffness no less than a rubber composition containing a relatively equal amount of common commercial carbon black.

11. The process of compounding rubber comprising the step of incorporating therein a finely divided carbon having an oil absorption number less than 100 and rubber stiffening qualities no less than those of common commercial carbon black.

12. The process of compounding rubber comprising the step of incorporating therein a finely divided carbon having an oil absorption number materially less than that of common commercial carbon black and rubber stiffening qualities no less than those of common commercial carbon black.

In testimony whereof, I have hereunto set my hand at Los Angeles, California, this 29th day of February, 1924.

NORRIS GOODWIN.